United States Patent Office 3,559,053
Patented Jan. 26, 1971

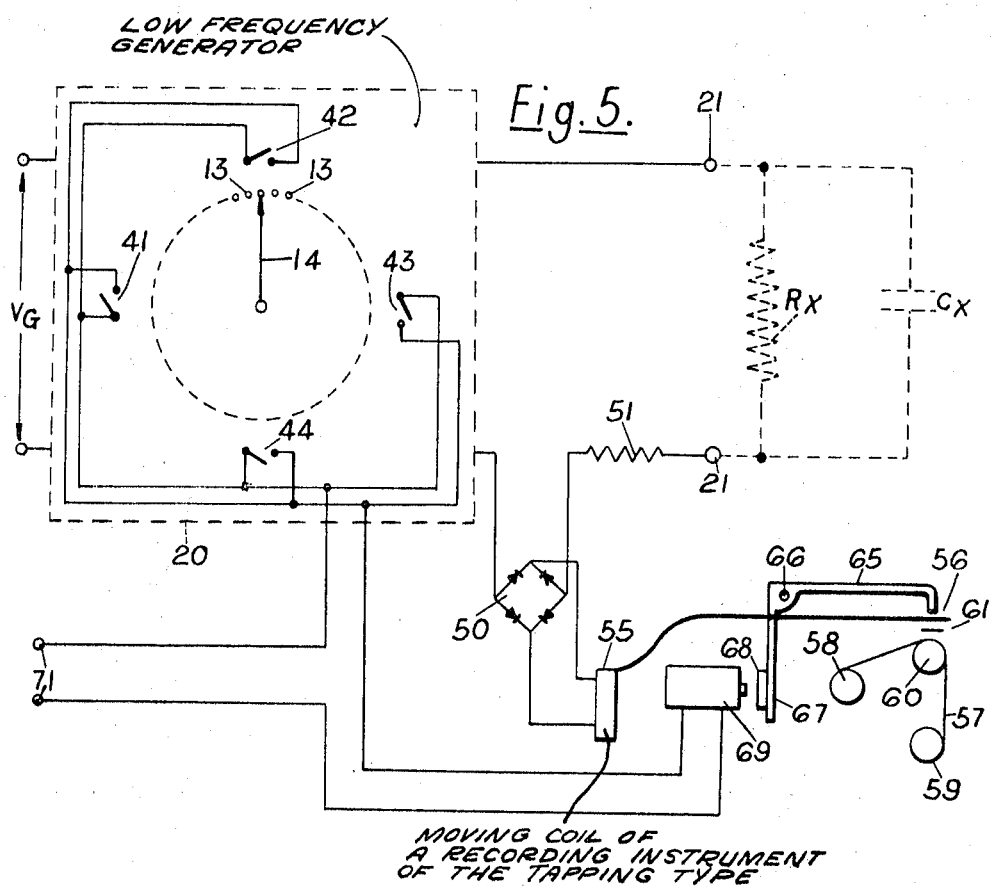

3,559,053
METHOD AND APPARATUS FOR MEASURING THE ELECTRICAL RESISTANCE OF INSULATING MATERIAL USING VERY LOW FREQUENCIES
George F. Tagg, London, England, assignor to Evershed & Vignoles Limited, Chiswick, London, England, a British company
Filed June 3, 1968, Ser. No. 734,140
Int. Cl. G01n 27/02
U.S. Cl. 324—62
6 Claims

ABSTRACT OF THE DISCLOSURE

A method of measuring the insulation resistance of a circuit having electrostatic capacitance in which a predetermined voltage of very low frequency of the order of 0.1 Hz. is applied to the circuit and substantially instantaneous measurements of the current are taken at the instants when the voltage is a maximum thus enabling the required resistance to be derived. Preferably measurements are taken of the current at the instants when the voltage is zero thus providing a measure of the capacitance under test. An instrument used in the method includes a generator capable of supplying a very low frequency alternating current to the output terminals of the instrument, a measuring circuit responding to the test current flowing and mechanism operating in synchronism with the generator for deriving from the measuring circuit a measurement of the current flowing at the required instants.

---

The normal method of insulation testing which has been used for the last half century is by means of high voltage direct current which is caused to flow through the insulation under test. This is quite satisfactory for routine testing of small installations such as houses and factory wiring, small machines and so forth but it is not so suitable for the testing of very large electrical machines and transformers since these possess considerable electrostatic capacitance. The tendency, therefore, is to use alternating current methods for testing this latter type of equipment but this in its turn leads to difficulties. For satisfactory results the test voltage needs to be of the order of several thousand volts and if a normal mains frequency is used and the machine to be tested has a capacitance, for example of 2 $\mu$f., the testing equipment must be capable of supplying the order of 10 kva. which rules out the possibility of a portable test set.

It has been suggested on a theoretical basis that various of the difficulties can be overcome by using an alternating current of very low frequency, which, for the purposes of the present specification, may be defined as of the order of 0.1 Hz. It can be shown that with frequencies of this order the change in voltage distribution from a normal supply frequency will not exceed about 0.5% and the advantage is, of course, that the capacitance in the circuit under test presents a very much higher impedance to this low frequency. Despite these theoretical proposals the problem has remained of providing a relatively simple and compact test set for carrying out insulation testing at these very low frequencies.

The general principle of insulation testing involves measuring, whether directly or indirectly, the current flowing in the circuit under test in response to a predetermined voltage, and then deriving the resistance from the relationship between them. Normal measuring instruments are not capable of providing an output in readable form when the current to be measured is fluctuating at the very low frequencies referred to above.

According to the present invention, substantially instantaneous measurements are taken of the current at the instants when the voltage is a maximum and preferably also when it is zero. At the instant when the voltage is a maximum the current flowing is a measure of the resistance of the insulation being measured and at this time the capacitance current is zero. When the test voltage is zero, however, the resistance current is also zero, but since the current wave for the capacitance current is 90° out of phase with the applied voltage the capacitance current is then a maximum. The current flowing at this instant thus provides a measure of the capacitance of the circuit under test.

An instrument operating in this way needs to include a generator capable of supplying a very low frequency current to the output terminals of the instrument, a measuring circuit responding to the test current flowing and mechanism operating in synchronism with the generator for deriving from the measuring circuit a measurement of the current flowing at each instant when the voltage is a maximum. As previously explained this measurement will provide an indication of the resistance of the circuit and if a measurement of the capacitance is also required the mechanism also needs to derive a measurement of the current at each instant when the voltage is zero.

The very low frequency supply which is necessary cannot be obtained from a normal generator, and a generator therefore needs to be specially designed for the purpose. This preferably comprises a potential dividing resistance having a circular array of contact studs which are swept by a contact arm driven from a constant speed electric motor, the resistance being fed with direct current and the individual resistors between adjacent studs having magnitudes such that the output voltage tapped off between the mid-point of the resistance and the contact arm varies substantially sinusoidally. Such a generator uses only very simple components and as a result is extremely reliable. An electronically operated generator may also, however, be used as an alternative.

In order to obtain the substantially instantaneous measurements of current at the different points in the voltage waveform the mechanism for this purpose preferably includes an electric switch or switches which are operated by the contact arm of the generator just described. This ensures that the mechanism operates in synchronism with the generator to obtain the measurements at the correct instants. These switches may conveniently be of the reed type operated by a magnet on the contact arm.

A convenient form of measuring circuit which may be used in an instrument in accordance with the invention comprises a low resistor connected between the output of the generator and one of the terminals of the instrument and an adjustable potential dividing resistor connected to a source of direct current and also connected so that the potential across it, when adjusted, balances that across the small resistor. The connections between the two resistors include the switches just mentioned which are operated by the contact arm and also a galvanometer to indicate the balance point. It will be appreciated that the balancing circuit just described will be completed for each time one of the switches is operated by the contact arm. If the instrument is intended to measure capacitance as well as resistance, these two measurements must be carried out separately and the first reading, e.g. of resistance is carried out by using only the switch which closes at the instant of maximum voltage. The adjustable resistor is then adjusted until the balance point is achieved at each of these instants as indicated by the galvanometer and this then enables the insulation resistance to be derived from a knowledge of the constants of the circuit. In other words a knowledge of the value of the low resistor, the value of the potential dividing resistor at the balance point and the value of the voltage supplying the adjustable resistor allows the voltage drop across the small resistor to be calculated and hence gives the value of the insulation resistance. If a similar reading is taken using the switch which closes at each instant of zero generator voltage the result obtained gives the capacitance of the insulation.

Although the calculations just described are quite straightforward it may sometimes be desirable to obtain a direct reading from the instrument and for this purpose the measuring circuit may include a moving coil recording instrument of the tapping type of which the chopper bar is operated by the mechanism operating in synchronism with the generator so as to make a mark on a chart surface at each of the instants when the measurement is required. The current flowing through the moving coil will vary substantially sinusoidally so that the pointer of the instrument will follow this fluctuation. The operation of the chopper bar then records the value of current at each required instant. With this type of measuring circuit it is possible to obtain simultaneous indications of the resistance and capacitance and thus to obtain two separate traces on the chart surface.

Most simply the chopper bar is operated by the switches previously referred to which energise a solenoid controlling the movement of the chopper bar. As previously described these switches are operated by the contact arm of the generator and the chopper bar is thus operated at the required points. With this form of measuring circuit, however, electric switches are not essential since movement of the chopper bar can be mechanically synchronised with the generator. For example, the drive to the generator can also control a stepped cam which thus rotates in synchronism with the contact arm and operates the chopper bar at each required instant.

A direct reading instrument may also be obtained by modifying the previously described measuring circuit so as to provide an indication of the potential difference across the small resistor at the balance point. For this purpose a cross-coil ohmmeter movement may be included of which the control coil is connected across the direct current supply to the generator and the deflecting coil is connected across the portion of the potential dividing resistor which is connected to balance the potential drop across the small resistor. The current through the deflecting coil thus varies directly with the potential difference which is to be measured and this enables the instrument to be calibrated directly. It may thus have one scale in terms of resistance values (megohms) and the other in capacitance values (microfarads).

Constructions in accordance with the invention will now be described in more detail by way of example with reference to the accompanying drawings in which.

Figure 1:
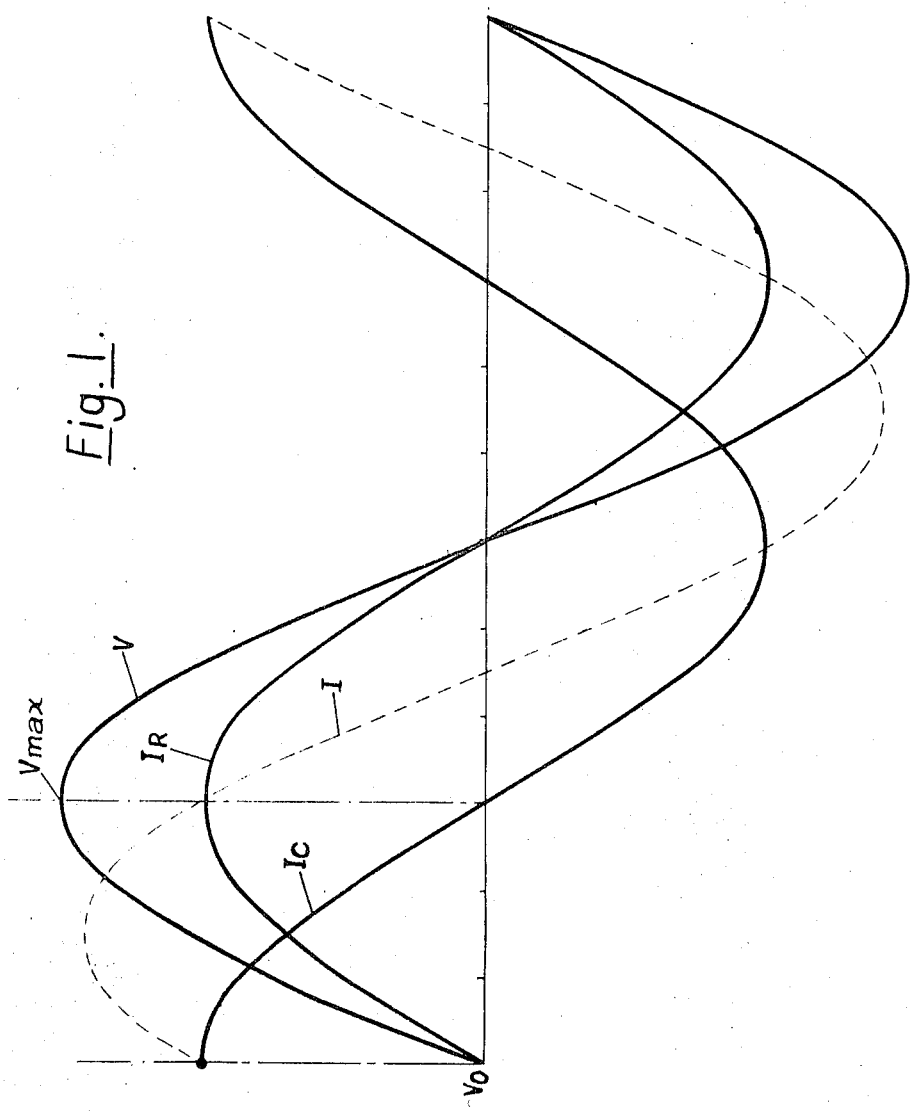
FIG. 1 is an explanatory waveform diagram.

The method of the present invention is based on the assumption that any insulation under test can be represented approximately by a resistance in parallel with a capacitance. The resulting voltage and current waves are shown in FIG. 1 the voltage wave being indicated as V and the current wave in dotted lines as I. The current consists of two components which are dependent on the respective values of the resistance and the capacitance of the insulation and are denoted by the two further curves $I_R$ and $I_C$ respectively. This diagram makes it clear that when the voltage is a maximum as denoted by the point $V_{max}$ the component $I_C$ is zero and the value of the current I is therefore equal to that of the component $I_R$. Accordingly if the current flowing is measured at this instant of time the measurement obtained will indicate the value of $I_R$ and will enable the resistance of the insulation to be measured. Similarly when voltage is zero as indicated by the point $V_O$ the current component $I_R$ is also zero and the value of the total current I provides a measure of the current component $I_C$ so that by taking a measurement at this instant the value of the capacitance of the insulation can be derived. This is the principle of operation of the forms of instruments in accordance with the invention which are about to be described.

Figure 2:
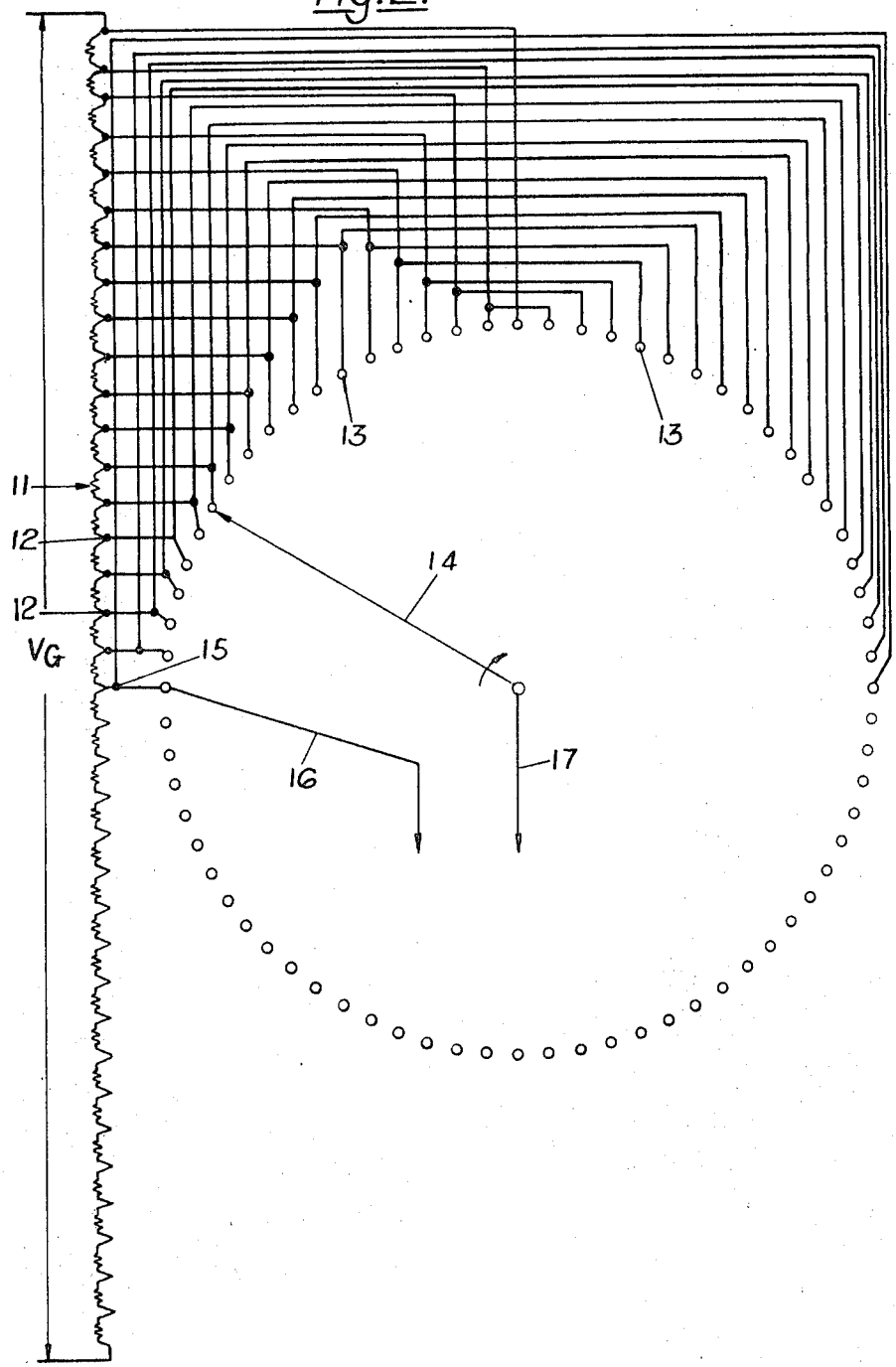
FIG. 2 is a circuit diagram of a very low frequency generator.

As previously explained the operation depends on the supply of current at a very low frequency of the order of 0.1 Hz. and the generator for this purpose is illustrated in FIG. 2. This comprises a potential dividing resistance indicated generally as 11 fed with direct current at a voltage indicated as $V_G$. Tapping points 12 on the resistance 11 are connected to a circular array of contact studs 13 which are supplied by a contact arm 14 moved in a clockwise direction by a constant speed electric motor (not shown). Each tapping point 12 is connected to two of the studs 13 and the points 12 in the lower half of the resistance 11 are similarly connected to studs 13 in the lower half of the ring, the detailed connections being omitted for purposes of simplicity. The output of the generator is tapped off from the mid-point 15 of the resistance 11 by way of a conductor 16 and from the contact arm 14 by way of a further conductor 17. The values of the individual resistance steps between adjacent tapping points 12 have magnitudes such that the output voltage tapped off between the conductors 16 and 17 varies substantially sinusoidally. It will be understood that when the contact arm is in contact with the stud corresponding to the midpoint 15 this voltage will be zero and will, of course increase to a maximum over a quarter of a revolution until the contact arm is in engagement with the stud connected to the end of the resistance 11, after which the voltage will decrease for the next quarter of a revolution. For the following quarter of a revolution the voltage will increase again in the opposite direction and for the final quarter of a revolution it will decrease again back to zero value to complete the cycle of the sine wave. Such a generator uses only very simple components and depends for consistency of operation only on the constant speed driving motor.

Figure 3:
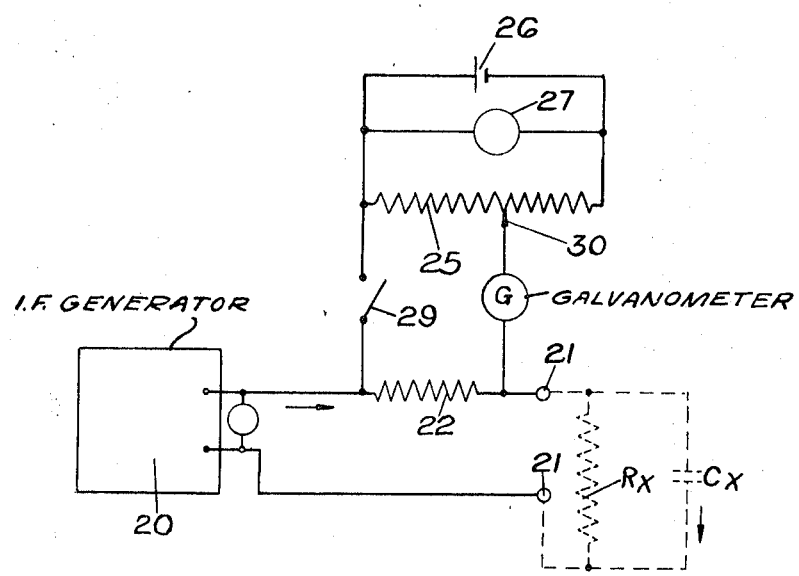
FIG. 3 is a diagrammatic circuit diagram of a complete instrument showing one form of measuring circuit.

Such a generator is indicated as 20 in the circuit diagram of FIG. 3. This generator supplies the output terminals of the instrument shown as 21 by way of a resistor 22 which has a low value in comparison with the resistance of the insulation to be measured. The insulation itself is indicated in dotted lines as having a resistance $R_X$ and a capacitor $C_X$. As has already been explained the value of the current flowing in the insulation under test when the voltage is a maximum provides a measure of $R_X$ while that flowing when the voltage is zero provides a measure of $C_X$ and these values are obtained by measuring the corresponding potential drops across the resistor 22.

For this purpose a balancing circuit is connected across the resistor 22 comprising an adjustable potential dividing resistor 25 fed with direct current from a source 26 the voltage of which is indicated by a voltmeter 27. The left-hand ends of the resistors 22 and 25 are connected through a switch shown as 29 and the right-hand end of the resistor 22 is connected to the tapping point 30 on the resistor 25 by way of a galvanometer G. The switch 29 is closed at the instants when the test current is to be measured. If only the resistance of the insulation is to be measured the switch 29 is closed at the points corresponding to $V_{max}$ in FIG. 1 and is thus closed only once per cycle since when maximum voltage is achieved in the opposite direction this cannot be balanced by the potential across the resistor 25 which is unidirectional. The tapping 30 on the resistor 25 is then adjusted until the galvanometer G shows no deflection when the switch 29 is closed and it is then known that the potential drop across the left-hand portion of the resistor 25 is equal to that across the resistor 22.

In a particular example the generator 20 has 72 contact studs as illustrated in FIG. 2 and the contact arm 14 is driven by its motor at 6 r.p.m. to give the required frequency of 0.1 Hz. The supply voltage $V_G$ is 2,000 volts to give an output ranging sinusoidally between +1,000 and −1,000. The total resistance of the resistor 11 is 400,000 ohms with the individual steps being proportioned accordingly. In the circuit of FIG. 3 the resistor 22 has a value of 100,000 ohms which is low in relation to any insulation resistance which is likely to be measured. The resistor 25 has a total resistance of 10,000 ohms and is supplied with direct current at 12 volts, the source 26 being either a battery or a transformer rectifier unit operated from the supply mains. From a knowledge of these figures it is a simple matter to calculate firstly the potential drop across the resistor 22 at the balance point and from this the current flowing and hence the value of $R_X$.

If the value of the capacitance $C_X$ is to be measured the switch 29 needs to be closed at the instants of zero voltage when the current component $I_C$ is positive, i.e. at the extreme left of the diagram of FIG. 1. A similar calculation to that already described then provides the value of the capacitance. In practice two switches 29 may be included which are connected in parallel so as to be operated by the contact arm 14 at the appropriate points in its revolution. These switches are not shown in FIG. 2 but are preferably reed-type switches operated by a small magnet on the arm 14.

Figure 4:
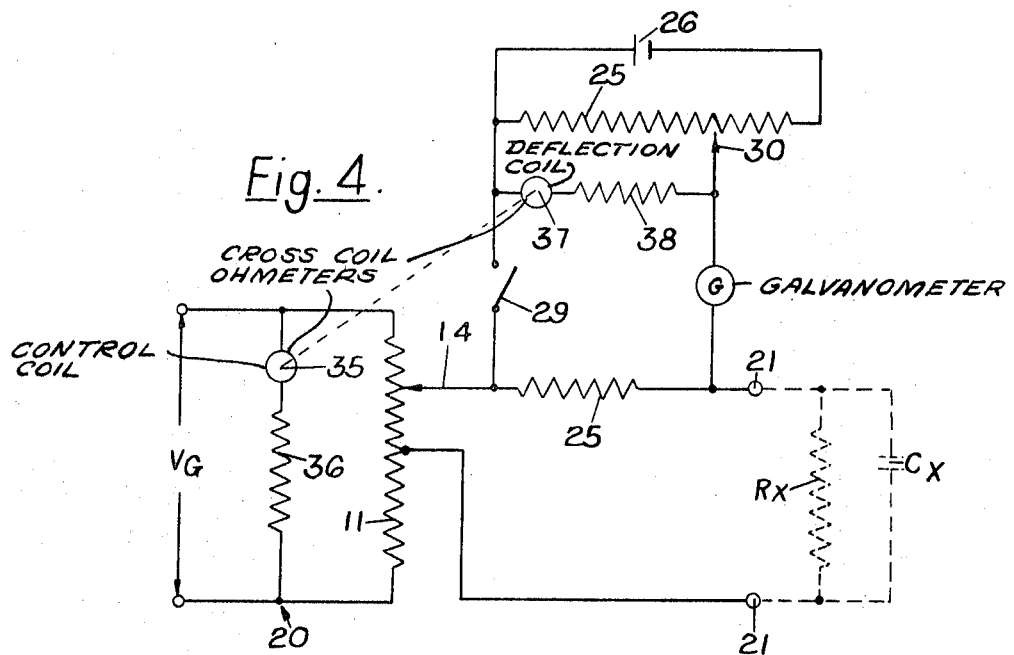
FIG. 4 is a view corresponding to FIG. 3 but showing a modification of the measuring circuit, and, FIG. 5 is a further view similar to FIG. 3 but showing an alternative form of measuring circuit.

The calculation described in relation to FIG. 3 is necessary to obtain the voltage across the resistor 22 and FIG. 4 shows a modification of the circuit of FIG. 3 in which this value can be read off directly thus avoiding the need for such calculation. All the components of FIG. 3 are included in FIG. 4 and are indicated by the same reference numerals. For a better understanding, however, the generator 20 is illustrated slightly more fully to show the resistor 11 and the contact arm 14. In addition to the components of FIG. 3 the circuit includes a cross coil movement of the ohmmeter type of which the control coil shown as 35 in series with a resistor 36 is connected across the voltage source $V_G$ supplying the generator 20. The deflection coil 37 in series with a resistor 38 is connected across the portion of the resistor 25 which is connected in circuit to balance the potential across the resistor 22. In other words the coil 37 responds to the voltage which is to be measured so as to provide a direct reading. The control coil 35 produces an effectively constant controlling torque but any minor variations in the voltage $V_G$ affect both coils 35 and 37 equally and thus do not affect the ultimate reading.

Since the instrument may be used either for measuring $R_X$ or $C_X$ it needs to be calibrated in terms of both quantities. In other words it has one scale in terms of resistance values and the other in capacitance values.

If both the resistance and the capacitance are to be measured simultaneously the alternative measuring circuit of FIG. 5 may be used. In this figure the generator is again shown as 20 but the contact arm 14 and the studs 13 are also illustrated so as to show the positions of four reed-type switches 41, 42, 43 and 44 arranged at intervals of 90° to be operated by a magnet carried by the contact arm 14. The output of the generator is again supplied to the terminals 21 to the insulation to be tested but in this case test current flows through a full wave rectifier 50 in series with a limiting resistor 51. The rectified output from the rectifier 50 is supplied to the moving coil 55 of a recording instrument of the tapping type. This includes a pointer 56 which moves in relation to a chart 57 which is wound from a storage roll 58 to a take-up roll 59 by way of a guide roll 60. A typewriter ribbon indicated diagrammatically as 61 passes between the pointer 56 and the chart 57 and the pointer 56 is acted on periodically by a chopper bar 65 pivoted at 66 and having an arm 67 carrying an armature 68 acted on by a solenoid 69. Consequently each time the solenoid 69 is operated the chopper bar 65 presses the pointer 56 downwardly to make a corresponding mark on the chart 57 by way of the typewriter ribbon 61.

The presence of the full wave rectifier 50 ensures that the current to the moving coil 55 is always in the same sense but it nevertheless varies sinusoidally in a manner similar to that shown in FIG. 1 except that alternative half cycles are of reverse polarity. Owing to the very low frequency used and the design of the instrument the pointer 56 is able to follow these sinusoidal variations of the current and the chopper bar 65 is operated by means of the switches 41 to 44 at the instants corresponding to maximum and zero voltage of the generator 20. As will be seen these four switches are connected in parallel so as to connect a source of supply 71 to operate the solenoid 69 each time any switch is closed. The chopper bar 65 will thus be operated four times in each cycle i.e. for each revolution of the contact arm 14. Owing to the presence of the rectifier 50 there will be two indications per cycle of the resistance and two indications of the capacitance so that the chart 57 will bear two separate traces, one corresponding to the resistance and the other to the capacitance. By appropriate calibration of the chart the value of either of these quantities can be read off directly.

I claim:
1. A method of measuring the insulation resistance of a circuit having electrostatic capacitance, said method comprising the steps of applying a predetermined voltage of very low frequency of the order of 0.1 Hz. to said circuit, taking at least one instantaneous measurement of the current flowing in said circuit at the instant when said voltage is a maximum and deriving said resistance from said measurement.

2. An instrument for the measurement of the insulation resistance of a circuit having electrostatic capacitance, said instrument comprising:
   output terminals for the connection of said resistance;
   a generator for supplying voltage of a very low frequency of the order of 0.1 Hz.;
   means connecting said generator to said output terminals;
   a measuring circuit connected to respond to the test current flowing when the insulation resistance is connected across said terminals, said test current being directly proportional to the insulation resistance and said measuring circuit including means for deriving a measurement of said test current to derive said insulation resistance; and
   means synchronizing said means for deriving with said generator whereby to obtain said measurement at predetermined points in the cycle of said low frequency voltage corresponding to voltage maximum or minimum.

3. An instrument according to claim 2 in which said generator comprises a potential dividing resistance divided into steps and having a mid-point, a circular array of contact studs, one connected to each said resistance step, respectively, a contact arm mounted to sweep said studs, a constant speed electric motor driving said contact arm, means supplying said resitsance with direct current and means for tapping off the output voltage between said mid-point of said resistance and said contact arm, said resistance steps having magnitudes such that said output voltage varies substantially sinusoidally.

4. An instrument as defined by claim 3 in which said measuring circuit comprises:
   a first resistor having a resistance value which is low with respect to the resistance to be measured, said resistor being connected between the output of said generator and one of said terminals;
   an adjustable potential dividing resistor;
   a source of direct current connected across said potential dividing resistor;
   connections between said resistors whereby the potential across said potential dividing resistor when adjusted, balances that across said first resistor, said connections between said two resistors including said means for deriving in the form of switch means operated by said contact arm and a galvanometer to indicate the balance point.

5. An instrument as defined by claim 4 in which a cross coil ohm meter movement is connected to measure the potential difference at the balance point, the control coil of the movement being connected across the direct current supply to said potential dividing resistance and the deflecting coil being connected across that portion of the potential dividing resistor which is connected to balance the potential drop across said small resistor.

6. An instrument as defined by claim 2 in which said measuring circuit includes a moving coil recording instrument of the tapping type and a chopper bar operated by said means for deriving for recording a measured resistance on a chart surface.

References Cited

UNITED STATES PATENTS

| | | | |
|---|---|---|---|
| 1,820,738 | 8/1931 | Gruss et al. | 324—62 |
| 2,482,196 | 9/1949 | Marye | 324—62 |
| 2,791,750 | 5/1957 | Menzel et al. | 324—60 |
| 2,906,951 | 9/1959 | Blerkom | 324—63 |
| 2,949,577 | 8/1960 | France | 324—62 |
| 3,094,865 | 6/1963 | Dravnieks et al. | 73—86 |
| 3,150,315 | 9/1964 | Simon | 324—62 |

EDWARD E. KUBASIEWICZ, Primary Examiner